(12) United States Patent
Bosworth

(10) Patent No.: US 11,924,330 B1
(45) Date of Patent: Mar. 5, 2024

(54) CRYPTOGRAPHIC KEY EXCHANGE

(71) Applicant: Meta Platforms Technologies, LLC, Menlo Park, CA (US)

(72) Inventor: Andrew Garrod Bosworth, San Mateo, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/721,170

(22) Filed: Apr. 14, 2022

(51) Int. Cl.
| | |
|---|---|
| *H04L 9/40* | (2022.01) |
| *H04L 9/08* | (2006.01) |
| *H04L 9/16* | (2006.01) |
| *H04L 67/1001* | (2022.01) |
| *G06F 21/62* | (2013.01) |

(52) U.S. Cl.
CPC .............. *H04L 9/0822* (2013.01); *H04L 9/16* (2013.01); *H04L 63/04* (2013.01); *H04L 63/061* (2013.01); *H04L 63/065* (2013.01); *H04L 67/1001* (2022.05); *G06F 21/6209* (2013.01)

(58) Field of Classification Search
CPC . H04L 9/16; H04L 9/08; H04L 9/0803; H04L 9/0822; H04L 9/088; H04L 9/0891; H04L 63/04; H04L 63/061; H04L 63/06; H04L 63/065; H04L 63/068; H04L 63/10; H04L 63/101; G06F 21/62; G06F 21/6209; H04W 12/04; H04W 12/08
See application file for complete search history.

(56) References Cited

U.S. PATENT DOCUMENTS

| | | | |
|---|---|---|---|
| 9,654,288 B1 * | 5/2017 | Howell | H04L 9/14 |
| 11,343,080 B1 * | 5/2022 | Bagley | G06F 21/31 |
| 2012/0023332 A1 * | 1/2012 | Gorodyansky | H04L 63/105 713/168 |
| 2013/0125201 A1 * | 5/2013 | Sprague | G06F 21/6263 726/28 |
| 2017/0359331 A1 * | 12/2017 | Bonnet | H04L 9/0836 |

* cited by examiner

*Primary Examiner* — Shaqueal D Wade-Wright
(74) *Attorney, Agent, or Firm* — McDermott Will & Emery LLP

(57) ABSTRACT

Various aspects of the subject technology relate to systems, methods, and machine-readable media for providing an encryption key exchange. Various aspects may include identifying a database of cryptographic keys configured for encryption. Aspects may also include sending a request for a private key for decryption of content. Aspects may also include receiving the private key from a client. Aspects may also include determining a visibility parameter for content posts of the content based on the private key and database. Aspect may include providing the content posts to the client at a visibility according to the visibility parameter.

20 Claims, 9 Drawing Sheets

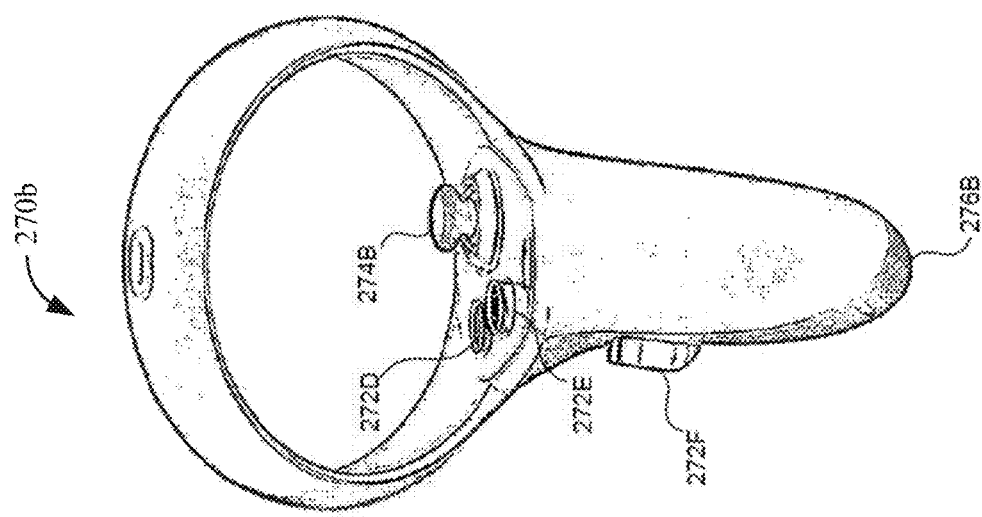
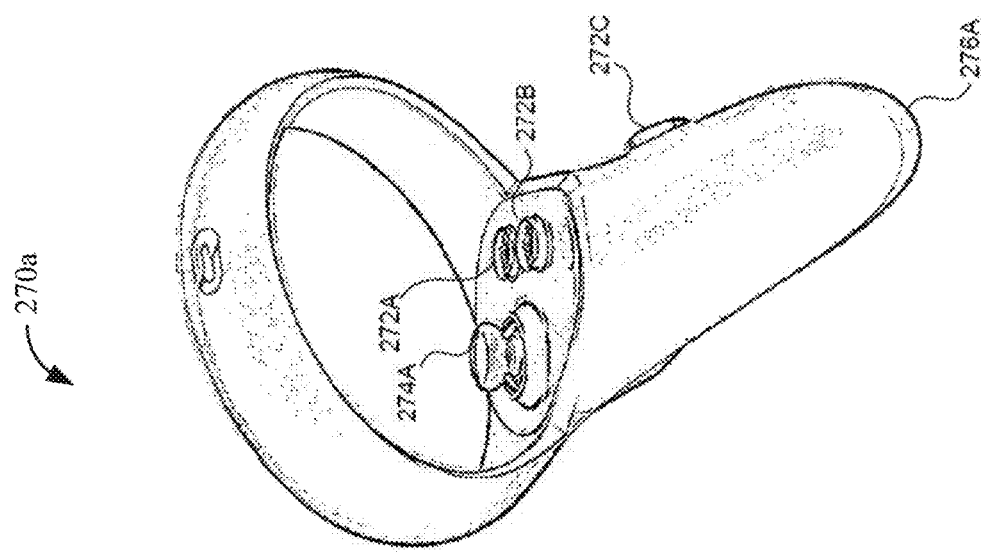
FIG. 2C

CRYPTOGRAPHIC KEY EXCHANGE

TECHNICAL FIELD

The present disclosure generally relates to providing secure cryptographic key exchanges, and more particularly to facilitating secure key exchange for selective sending and viewing of encrypted content.

BACKGROUND

Encrypted communication can involve the use of a private and public key pair, such as for end-to-end encryption. A server for a peer to peer key exchange can be configured to detect whether a user has a correct key prior to decryption of encrypted content, such as for secure key exchange. It may be beneficial to use a peer to peer (p2p) exchange architecture rather than integrated end-to-end encryption for more efficient implementation of encrypted content. Private keys may be used as indicators of how much of the encrypted content should be shown. Enabling clients to have secured communications via server side key detection and key exchange brokering to facilitate access to the encrypted content without granting access to the client's private key may advantageously maintain clients' privacy of their private keys.

BRIEF SUMMARY

The subject disclosure provides for systems and methods for providing an encryption key exchange. The encryption key exchange can be used for determining (e.g., by a server) a portion of encrypted content that should be visible to a particular client device. For example, the encrypted content can be hosted by the server for sharing at a particular visibility parameter as part of a p2p key exchange architecture. As an example, the encrypted content may be content of a content post or other content unit shared to a computer hosted network of information (e.g., a social network). The visibility or quantity of the encrypted content being shared by a subject user with other users can be based on detection of a type of private key. The subject user can grant access to the encrypted content or a portion thereof to a quantity of other users based on sharing the types of private keys controlled and determined by the subject user for decrypting or partially decrypting the encrypted content. In particular, the sharing can be performed via a secure key exchange implemented by the server, in which a key exchange includes metadata for each client device to be informed of which private key or type thereof is required to decrypt the encrypted content.

The subject disclosure may provide a technical solution to a problem arising in the context of computer encryption and/or computing network/content encryption. Advantageously, the subject disclosure enables a secure p2p key exchange that enhances the security of sharing content to a computing network. Client devices advantageously may post encrypted content that can be decrypted at a full or partial visibility level designed by the client devices without disclosing private key(s) to the server, which may enhance the confidentiality and security of clients' private keys. The keys exchanged in the p2p key exchanged can be shared via a computing device based application. The application can be used for encryption such as encrypting text, storing types of public and/or private keys, implementing a protocol for cryptographic key exchange, and/or the like. As an example, the key exchange can be provided for encrypting and decrypting communication in an artificial reality environment, such as according to user specified commands and preferences. Moreover, the server that implements the p2p key exchange can perform key rotation for improving security.

According to one embodiment of the present disclosure, a computer-implemented method for providing an encryption key exchange is provided. The method includes identifying a database of cryptographic keys configured for encryption. The method also includes sending a request for a private key for decryption of content, such as via an application. The method also includes receiving the private key from a client. The method also includes determining a visibility parameter for content posts of the content based on the private key and the database of cryptographic keys. The method also includes providing the content posts to the client at a visibility according to the visibility parameter.

According to one embodiment of the present disclosure, a system is provided including a processor and a memory comprising instructions stored thereon, which when executed by the processor, causes the processor to perform a method for providing an encryption key exchange. The method includes identifying a database of cryptographic keys configured for encryption. The method also includes sending a request for a private key for decryption of content, such as via an application. The method also includes receiving the private key from a client. The method also includes determining a visibility parameter for content posts of the content based on the private key and the database of cryptographic keys. The method also includes providing the content posts to the client at a visibility according to the visibility parameter.

According to one embodiment of the present disclosure, a non-transitory computer-readable storage medium is provided including instructions (e.g., stored sequences of instructions) that, when executed by a processor, cause the processor to perform a method for providing an encryption key exchange. The method includes identifying a database of cryptographic keys configured for encryption. The method also includes sending a request for a private key for decryption of content, such as via an application. The method also includes receiving the private key from a client. The method also includes determining a visibility parameter for content posts of the content based on the private key and the database of cryptographic keys. The method also includes providing the content posts to the client at a visibility according to the visibility parameter.

According to one embodiment of the present disclosure, a non-transitory computer-readable storage medium is provided including instructions (e.g., stored sequences of instructions) that, when executed by a processor, cause the processor to perform a method for providing an encryption key exchange. The method includes identifying a database of cryptographic keys configured for encryption. The method also includes sending a request for a private key for decryption of content, such as via an application. The method also includes receiving the private key from a client. The method also includes determining a visibility parameter for content posts of the content based on the private key and the database of cryptographic keys. The method also includes providing the content posts to the client at a visibility according to the visibility parameter. The method also includes determining a breach in the encryption associated with the private key. The method also includes determining a quantity of other clients to receive new cryptographic keys to access the content posts according to the visibility parameter and based on the breach and the client. The method also includes providing a new private key based on the breach and retirement of the private key via the application and from the database.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2C illustrates controllers for interaction with an artificial reality environment, according to certain aspects of the present disclosure.

Figure 1:
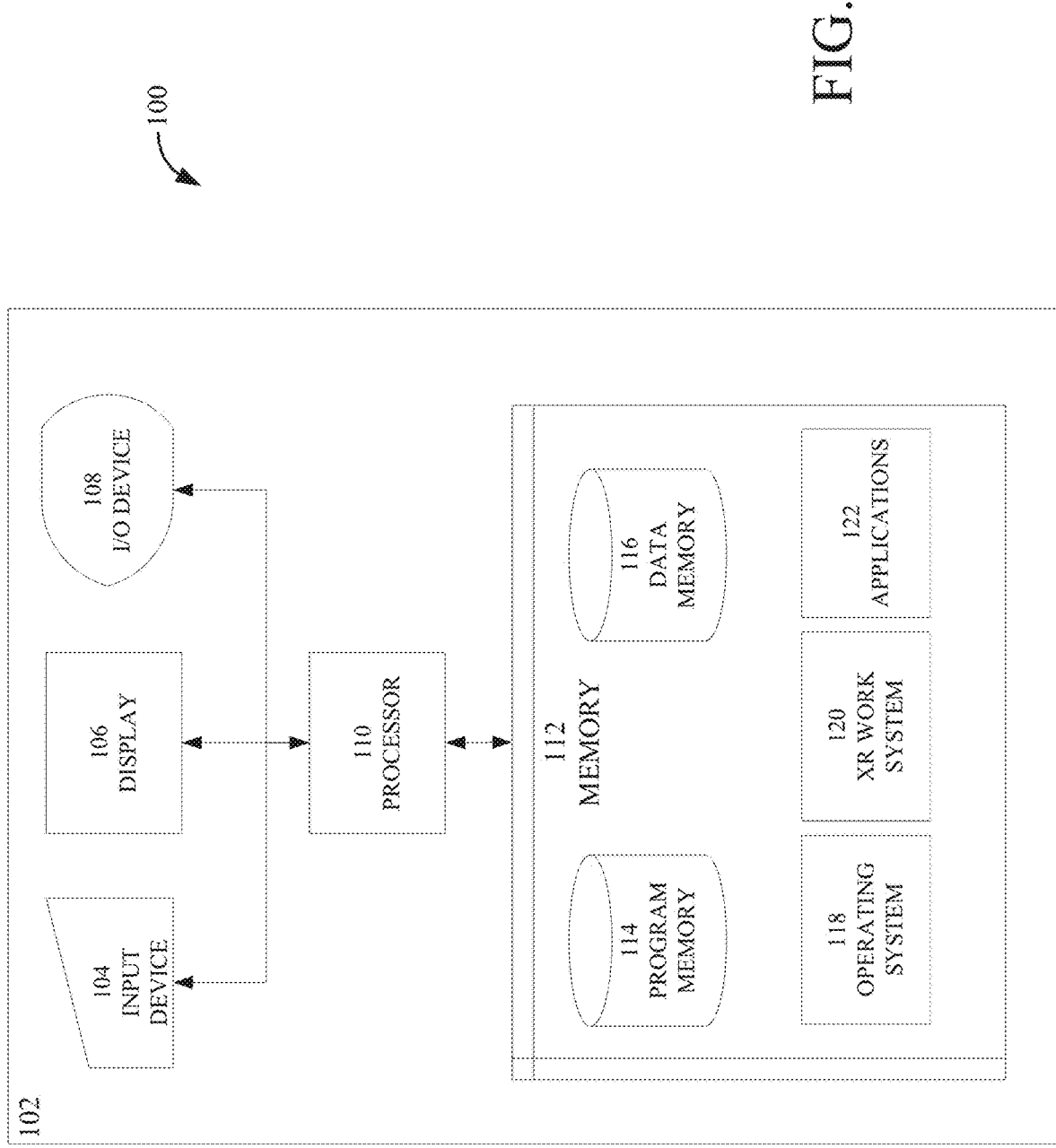
FIG. 1 is a block diagram of a device operating environment with which aspects of the subject technology can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The disclosed system addresses a problem in computer network based encryption technology, namely, the technical problem of encrypting content within a computer network or generated shared artificial reality environment. The disclosed system solves this technical problem by providing a solution also rooted in computer technology, namely, by providing a cryptographic key exchange such as a p2p public/private key exchange with metadata for each client to be informed of what key is necessary to decode encrypted content. The cryptographic key exchange can be configured for secure sending or transportation of public and private key pairs, such as based on wrapping or transport keys. The disclosed system improves the functioning of encryption and computing networks because client devices are not required to disclose personal private cryptographic keys. Rather, the server of the computer network may accept a public key used to encrypt the encrypt content instead and via an upstream app for encryption, for example. Content can be posted or otherwise shared via the computer network without encryption being performed by the server. Moreover, the disclosed system can provide dynamic tailored visibility of encrypted content depending on a type of cryptographic key provided by client devices. In this way, secure communication within environments such as messaging environments, shared artificial reality environments, or other computer networking environments may be improved.

Aspects of the present disclosure are directed to improving secured and/or encrypted communication within artificial reality environments. For example, an artificial reality environment may be a shared artificial reality environment, a virtual reality (VR), an augmented reality environment, a mixed reality environment, a hybrid reality environment, a non immersive environment, a semi immersive environment, a fully immersive environment, and/or the like. The artificial environments may also include artificial collaborative gaming, working, and/or other environments which include modes for interaction between various people or users in the artificial environments. The artificial environments of the present disclosure may provide secured or encrypted elements without requiring disclosure of private keys. As used herein, "real-world" objects are non-computer generated and artificial or VR objects are computer generated. For example, a real-world space is a physical space occupying a location outside a computer and a real-world object is a physical object having physical properties outside a computer. For example, an artificial or VR object may be rendered and part of a computer-generated artificial environment.

Embodiments of the disclosed technology may include or be implemented in conjunction with an artificial reality system. Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some implementations, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real-world after they have passed through a computing system. For example, a tablet with a camera on the back can capture images of the real-world and then display the images on the screen on the opposite side of the tablet from the camera. The tablet can process and adjust or "augment" the images as they pass through the system, such as by adding virtual objects. AR also refers to systems where light entering a users' eye is partially generated by a computing system and partially composes light reflected off objects in the real-world. For example, an AR headset could be shaped as a pair of glasses with a pass-through display, which allows light from the real-world to pass through a waveguide that simultaneously emits light from a projector in the AR headset, allowing the AR headset to present virtual objects intermixed with the real objects the user can see. The AR headset may be a block-light headset with video pass-through. "Artificial reality," "extra reality," or "XR," as used herein, refers to any of VR, AR, MR, or any combination or hybrid thereof.

Several implementations are discussed below in more detail in reference to the figures. FIG. 1 is a block diagram of a device operating environment 100 with which aspects of the subject technology can be implemented. The device operating environment can comprise hardware components of a computing system 100 that can create, administer, and provide interaction modes for a shared artificial reality environment (e.g., collaborative artificial reality environment), such as communication modes. The interaction/communication modes can include various modes for communication between client devices connected to the shared environment, such as messaging capabilities, verbal communication, and other XR type communicative mechanism for each user of the computing system 100. In various implementations, the computing system 100 can include a single computing device or multiple computing devices 102 that communicate over wired or wireless channels to distribute processing and share input data.

In some implementations, the computing system 100 can include a stand-alone headset capable of providing a computer created or augmented experience for a user without the need for external processing or sensors. In other implementations, the computing system 100 can include multiple computing devices 102 such as a headset and a core processing component (such as a console, mobile device, or server system) where some processing operations are performed on the headset and others are offloaded to the core processing component. Example headsets are described below in relation to FIGS. 2A-2B. In some implementations, position and environment data can be gathered only by sensors incorporated in the headset device, while in other implementations one or more of the non-headset computing devices 102 (e.g., wrist wearables) can include sensor components that can track environment or position data, such as for implementing computer vision functionality.

The computing system 100 can include one or more processor(s) 110 (e.g., central processing units (CPUs), graphical processing units (GPUs), holographic processing units (HPUs), etc.) The processors 110 can be a single processing unit or multiple processing units in a device or distributed across multiple devices (e.g., distributed across two or more of computing device 102s). The computing system 100 can include one or more input devices 104 that provide input to the processors 110, notifying them of actions. The actions can be mediated by a hardware controller that interprets the signals received from the input device 104 and communicates the information to the processors 110 using a communication protocol. The processors 110 can be coupled to other hardware devices, for example, with the use of an internal or external bus, such as a PCI bus, SCSI bus, wireless connection, and/or the like. The processors 110 can communicate with a hardware controller for devices, such as for a display 106. The display 106 can be used to display text and graphics. In some implementations, the display 106 includes the input device 104 as part of the display, such as when the input device 104 is a touchscreen or is equipped with an eye direction monitoring system. In some implementations, the display is separate from the input device 104. Other I/O devices 108 can also be coupled to the processor, such as a network chip or card, video chip or card, audio chip or card, USB, firewire or other external device, camera, printer, speakers, CD-ROM drive, DVD drive, disk drive, etc.

The computing system 100 can include a communication device capable of communicating wirelessly or wire-based with other local computing devices 102 or a network node. The communication device can communicate with another device or a server through a network using, for example, TCP/IP protocols. The computing system 100 can utilize the communication device to distribute operations across multiple network devices. The processors 110 can have access to a memory 112, which can be contained on one of the computing devices 102 of computing system 100 or can be distributed across one of the multiple computing devices 102 of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. The memory 112 can include program memory 114 that stores programs and software, such as an operating system 118, XR work system 120, and other application programs 122 (e.g., XR games). The memory 112 can also include data memory 116 that can include information to be provided to the program memory 114 or any element of the computing system 100.

Figure 2B:
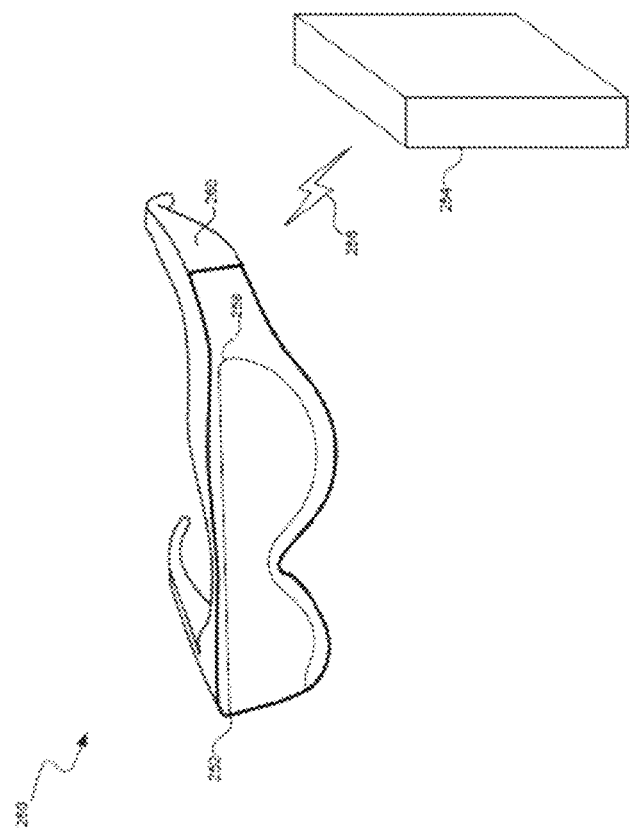
FIGS. 2A-2B are diagrams illustrating virtual reality headsets, according to certain aspects of the present disclosure.
Figure 2A:
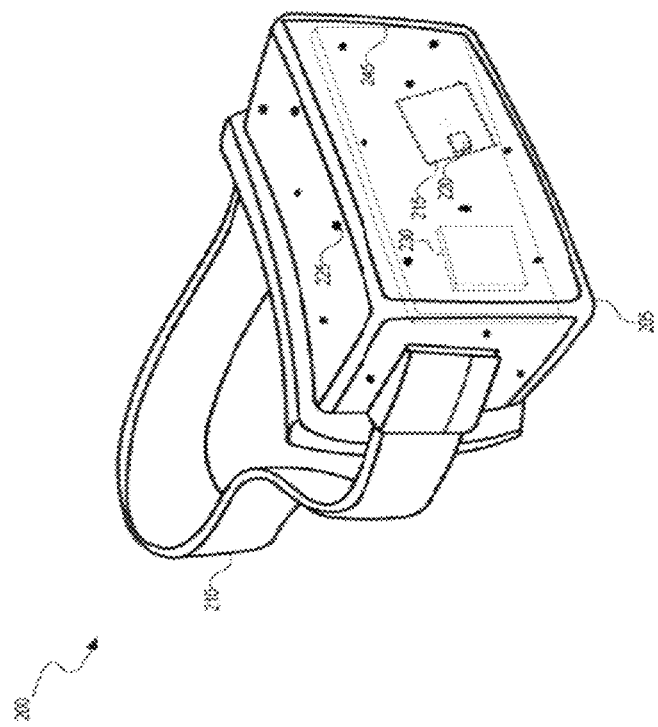

FIGS. 2A-2B are diagrams illustrating virtual reality headsets, according to certain aspects of the present disclosure. FIG. 2A is a diagram of a virtual reality head-mounted display (HMD) 200. The HMD 200 includes a front rigid body 205 and a band 210. The front rigid body 205 includes one or more electronic display elements such as an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF), six degrees of freedom (6DoF), etc. For example, the locators 225 can emit infrared light beams which create light points on real objects around the HMD 200. As another example, the IMU 215 can include, e.g., one or more accelerometers, gyroscopes, magnetometers, other non-camera-based position, force, or orientation sensors, or combinations thereof. One or more cameras (not shown) integrated with the HMD 200 can detect the light points, such as for a computer vision algorithm or module. The compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof. In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

FIG. 2B is a diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by the link 256. In other implementations, the mixed reality system 250 includes a headset only, without an external compute device or includes other wired or wireless connections between the mixed reality HMD 252 and the core processing component 254. The mixed reality system 250 may also include a wrist wearable, such as for converting wrist input gestures into navigation commands for scrolling in XR environments. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc. The electronic components may be configured to implement computing vision-based hand tracking for translating hand movements and positions to XR navigation commands or communication instructions/commands, which may include encrypted and/or non-encrypted content.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the users' eye. The output light can mix with light that passes through the display 258, allowing the output light to present virtual objects that appear as if they exist in the real-world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects. As an example, the HMD system 250 may include a coordinate system to track the relative hand positions for each user for determining how the user desires to scroll through the artificial reality environment with XR scrolling or for determining how the user desires to communicate with other users/user representations. The HMD system 250 can determine whether verbal communication, animation, textual communication, or other methods of communication should be confidential and therefore subject to some level of encryption. Moreover, the HMD system 250 can sense whether the user is in a private "home area" location of the shared XR environment for partial or full encryption. The user can cause cryptographic keys or information to be shared so that the user can selectively share desired content (e.g., messages, XR creations, etc.) with other designated users who are granted access to the user's content by the user.

FIG. 2C illustrates controllers 270a-270b, which, in some implementations, a user can hold in one or both hands to interact with an artificial reality environment presented by the HMD 200 and/or HMD 250. The controllers 270a-270b can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. For example, the compute units 230 can use the monitored hand positions to implement position control, rate control, nudges, and/or a combination thereof. As an example, the monitored hand positions can be used for communication, navigation, or other functions in the shared XR environment. The positions determined via the compute units 230 may be used by the controllers 270a-270b to interpret user inputs or commands, such as for determining content being communicated between users that should be encrypted or non-encrypted.

The controllers 270a-270b can also include various buttons (e.g., buttons 272A-F) and/or joysticks (e.g., joysticks 274A-B), which a user can actuate to provide input and interact with objects. As discussed below, controllers 270a-270b can also have tips 276A and 276B, which, when in scribe controller mode, can be used as the tip of a writing implement in the artificial reality environment. In various implementations, the HMD 200 or 250 can also include additional subsystems, such as an encryption unit, hand tracking unit, an eye tracking unit, an audio system, various network components, etc. to monitor and/or secure indications of user interactions and intentions. In some implementations, instead of or in addition to controllers, one or more cameras included in the HMD 200 or 250, or from external cameras, can monitor the positions and poses of the users' hands to determine gestures and other hand and body motions. Such camera-based hand tracking can be referred to as computer vision, for example. The encryption unit of the HMD 200 or 250 can be used to implement a p2p key exchange for detection of whether users in the XR environment have a valid key to access or partially access content that is at least partially encrypted.

Figure 3:
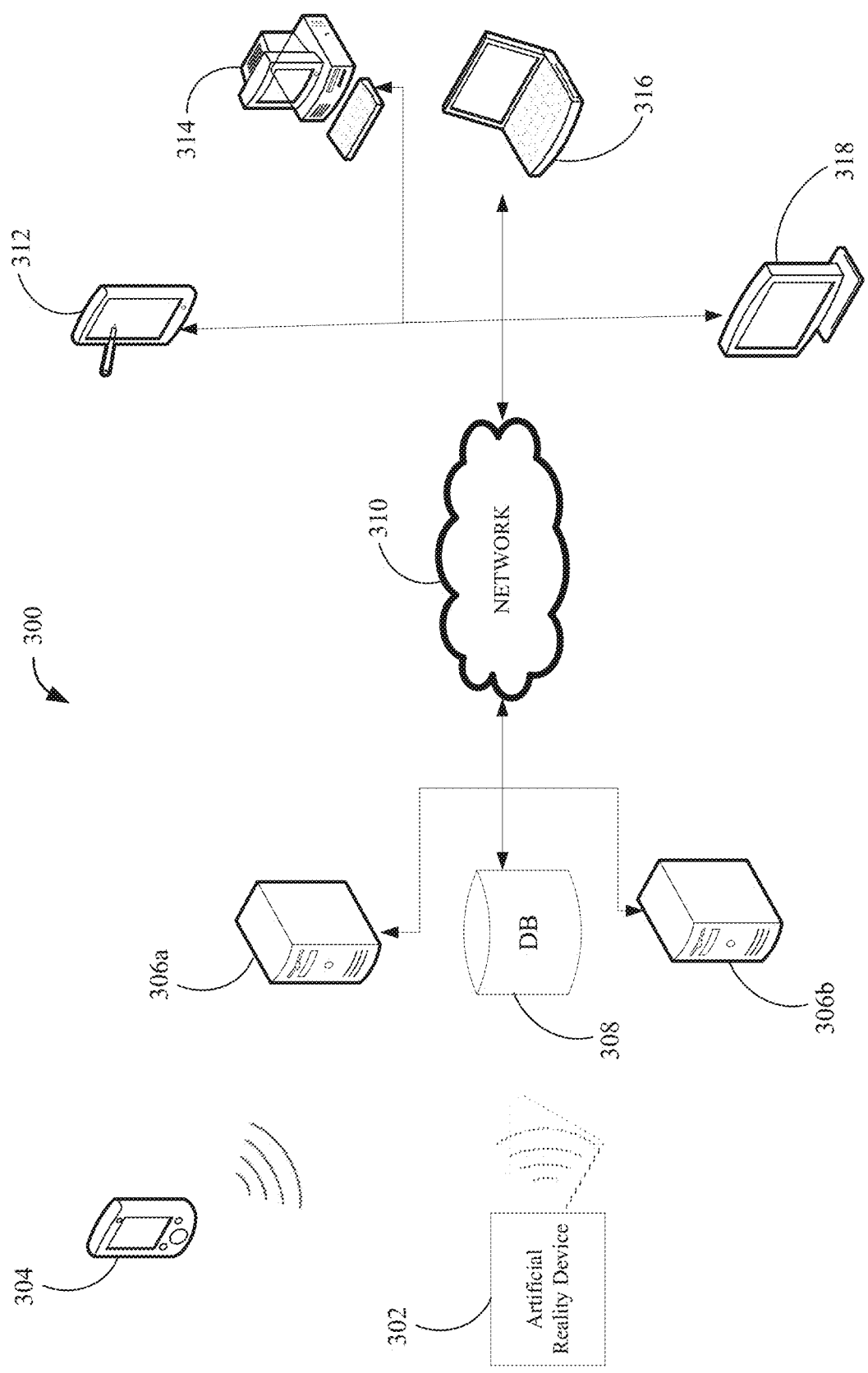
FIG. 3 is a block diagram illustrating an overview of an environment in which some implementations of the present technology can operate.

FIG. 3 is a block diagram illustrating an overview of an environment 300 in which some implementations of the disclosed technology can operate. The environment 300 can include one or more client computing devices, such as artificial reality device 302, mobile device 304, tablet 312, personal computer 314, laptop 316, desktop 318, and/or the like. The one or more client computing devices may store a private cryptographic key and be configured to share a predetermined quantity of public cryptographic keys. The private key may be used to encrypt content, such as content posted to a computer hosted social network. The shared copies of the public keys may be used by other client computing devices to partially or fully decrypt the encrypted content. As an example, various types of public keys may be used to decrypt a varying quantity of one or more portions of the encrypted posted content, depending on what type of public key is held. The client computing devices may be capable of communicating with each other, such as via messaging, verbal communication, communicative actions in XR, and/or the like. For conversations or other communications in XR, the artificial reality device 302 may connect one or more users to a shared XR environment via one or more corresponding user representations. The artificial reality device 302 may be the HMD 200, HMD system 250, a wrist wearable, or some other XR device that is compatible with rendering or interacting with an artificial reality or virtual reality environment.

Client devices may communicate wirelessly via the network 310. Moreover, other instances of the one or more client computing devices may be in at least partially encrypted communication via the network 310. Users of the one or more client devices can control what content being shared with other devices should be encrypted with their corresponding private key, or not encrypted at all. For example, users can select from user options to specify what content or data is gathered or shared. For example, users can control content being shared via opt-in/opt-out interfaces, such as via pop-ups or privacy settings as graphical elements on corresponding client devices. In some implementations, some of the client computing devices can be the HMD 200 or the HMD system 250. The client computing devices can operate in a networked environment using logical connections through network 310 to one or more remote computers, such as server computing devices. The server computing devices 306a-306b may be configured to show (e.g., make encrypted content visible) content to one or more of the client computing devices for those client computing devices that presented a correct public key. As an example, the server computing devices 306a-306b can include a database (e.g., database 308) that tracks which users of the client computing devices have granted access to their encrypted content (e.g., encrypted by corresponding privately held private keys) to other client users.

For example, for particular encrypted content posts, the server computing devices 306a-306b may implement a public key exchange and determine the visibility of the content posts hosted by the server computing devices for a particular client computing device based on what the public key presented by a particular client computing device is able to decrypt. The server computing devices 306a-306b may facilitate public key exchange between various of the client computing devices in a p2p fashion via the network 310. Moreover, the client computing devices may be responsible for encryption, such as encrypting text via personal private keys corresponding to the client computing device and maintaining the security of their own private keys. That is, the server computing devices 306a-306b may facilitate secure cryptographic key transfer without being involved in key generation or content encryption. This may advantageously improve security and encryption environments because the server computing devices 306a-306b do not have access to the private keys of client computing devices used for encrypting content. The server computing devices 306a-306b may maintain parallel encrypted versions of the same encrypted content (e.g., via one application) or the server computing devices can execute logic to recognize valid public keys for the same encrypted content (e.g., via multiple applications, one for each instance of the valid public keys).

In some implementations, the environment 300 may include a server such as an edge server which receives client requests and coordinates fulfillment of those requests through other servers. The server may include the server computing devices 306a-306b, which may logically form a single server. Alternatively, the server computing devices 306a-306b may each be a distributed computing environment encompassing multiple computing devices located at the same or at geographically disparate physical locations. The client computing devices and server computing devices 306a-306b can each act as a server or client to other server/client device(s). The server computing devices 306a-306b can connect to a database 308 or can comprise its own memory. Each server computing devices 306a-306b can correspond to a group of servers, and each of these servers can share a database 308 or can have their own database 308. The database 308 may logically form a single unit or may be part of a distributed computing environment encompassing multiple computing devices that are located within their corresponding server, located at the same, or located at geographically disparate physical locations. The database 308 can store data indicative of keys or access granted by a given user to other users of the given user's encrypted content and/or shared social media content that can be subscribed to by other users. The database 308 may also be used to facilitate key rotation in a one to many encryption architecture by causing issue of new keys when a copy of a shared key becomes comprised, for example.

The network 310 can be a local area network (LAN), a wide area network (WAN), a mesh network, a hybrid network, or other wired or wireless networks. The network 310 may be the Internet or some other public or private network. Client computing devices can be connected to network 310 through a network interface, such as by wired or wireless communication. The connections can be any kind of local, wide area, wired, or wireless network, including the network 310 or a separate public or private network. In some implementations, the server computing devices 306a-306b can be used as part of a social network such as implemented via the network 310. The social network can host content and protect access to the content, such as via the database 308, although the server computing devices 306a-306b of the social network does not have access to private keys and can be remote/separate from the application(s) that perform key generation and content encryption. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc.

Content items can be any digital data such as text, images, audio, video, links, webpages, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea. The social networking system can enable a user to enter and display information related to the users' interests, age/date of birth, location (e.g., longitude/latitude, country, region, city, etc.), education information, life stage, relationship status, name, a model of devices typically used, languages identified as ones the user is familiar with, occupation, contact information, or other demographic or biographical information in the users' profile. Any such information can be represented, in various implementations, by a node or edge between nodes in the social graph.

The social networking system can enable a user to upload or create pictures, videos, documents, songs, or other content items, and can enable a user to create and schedule events. Content items can be represented, in various implementations, by a node or edge between nodes in the social graph. The social networking system can enable a user to perform uploads or create content items, interact with content items or other users, express an interest or opinion, or perform other actions. The social networking system can provide various means to interact with non-user objects within the social networking system. Actions can be represented, in various implementations, by a node or edge between nodes in the social graph. For example, a user can form or join groups, or become a fan of a page or entity within the social networking system. In addition, the user can create, download, view, upload, link to, tag, edit, or play a social networking system object. The user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, the user can use location detection functionality (such as a GPS receiver on a mobile device) to "check in" to a particular location, and an edge can connect the user's node with the location's node in the social graph.

The social networking system can provide a variety of communication channels to users. For example, the social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post or other content item created or uploaded by the user or another user. And it can allow users to interact (via their avatar or true-to-life representation) with objects or other avatars in a virtual environment (e.g., in an artificial reality working environment), etc. In some embodiments, a user can post a status message to the user's profile indicating a current event, state of mind, thought, feeling, activity, or any other present-time relevant communication. The social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide a virtual environment where users can communicate and interact via avatars or other digital representations of themselves. Further, the first user can comment on the profile page of a second user or can comment on objects associated with the second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users, and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

In particular embodiments, one or more objects (e.g., content or other types of objects) of a computing system may be associated with one or more privacy settings. Privacy settings may be implemented by encrypting and decrypting content as described herein. The one or more objects may be stored on or otherwise associated with any suitable computing system or application, such as, for example, the social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identifies a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of a particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

Figure 4:
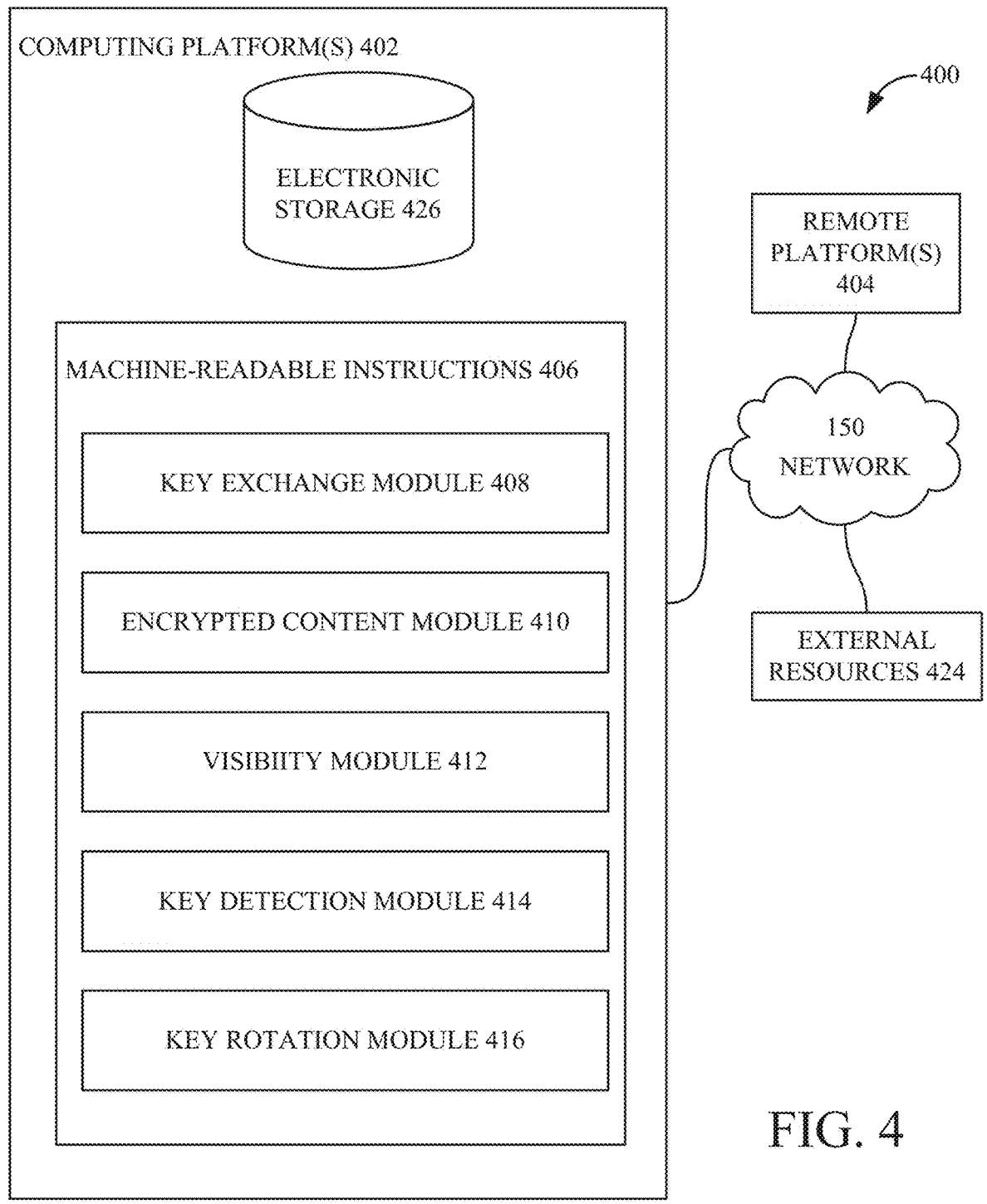
FIG. 4 is a block diagram illustrating an example computer system (e.g., representing both client and server) with which aspects of the subject technology can be implemented.

FIG. 4 is a block diagram illustrating an example computer system 400 (e.g., representing both client and server) with which aspects of the subject technology can be implemented. The system 400 may be configured for navigating through a communication environment such as a messaging, XR, other communicative environment, according to certain aspects of the disclosure. In some implementations, the system 400 may include one or more computing platforms 402. The one or more computing platforms 402 can correspond to or implement a social networking system and/or cryptographic key exchange. The computing platform(s) 402 can also correspond to a server component of a communication platform, which can be similar to or the same as the server computing devices 306a-306b of FIG. 3 and include the processor 110 of FIG. 1. The computing platform(s) 402 can be configured to store, receive, determine, and/or analyze user preferences (e.g., communication preferences) and/or user information to determine encrypted content and non-encrypted content in the communication environment. Moreover, the one or more computing platforms 402 may host/store encrypted content that is received or uploaded as a content post for the social networking system, for example.

In general, the one or more computing platforms 402 can detect whether a client device possesses a valid cryptographic key for accessing the encrypted content. For example, the encrypted content may be encrypted via a cryptographic system such as asymmetric key encryption (e.g., RSA (Rivest-Shamir-Adleman) encryption), AES-256 (advanced encryption standard) encryption, symmetric key encryption, hybrid key encryption, base64 encryption, and/or the like. The computing platform(s) 402 may be responsible for secure key transportation (e.g., based on wrapping keys or transport keys to encrypt a transport message during secure key exchange) while other components of the system are responsible for key generation and content encryption. As an example, client devices of the remote platform(s) 404 may perform content encryption with corresponding private cryptographic keys while external resources 424 can generate cryptographic keys such as public/private key pairs or instances according to an appropriate cryptographic system or protocol. As an example, the external resources 424 may include a keygen, such as using a random number generator function, a hardware security module (HSM), etc., to determine the length and number of bits of the generated cryptographic keys. The external resources 424 can also include key metadata, which could also be stored in the electronic storage 426.

The electronic storage 426 can include one or more databases for storing key sharing information, encrypted content, content subscription or user subscription information, and or the like. For example, the electronic storage 426 can store encrypted versions of content encrypted by private keys of client devices of the remote platform(s) 404. The electronic storage 426 may include data records that maintain a relationship between which public keys paired to the private keys have been duplicated, shared with other users/client devices, and/or used to decrypt portions or all of stored encrypted content. As an example, the encrypted content can be stored as content posts organized by topic, user, location, etc. on the social network system. Access to all or part of the content posts can be based on a type of public key presented by a particular client device of the remote platform(s) 404. Moreover, the electronic storage 426 may store metadata and other information associated with content or streams (e.g., video content or stream subscription information) being subscribed to by various client devices of the remote platform(s) 404.

The computing platform(s) 402 may be configured to communicate with one or more remote platforms 404 according to a client/server architecture, a peer-to-peer architecture, and/or other architectures. The remote platform(s) 404 may be configured to communicate with other remote platforms via computing platform(s) 402 and/or according to a client/server architecture, a peer-to-peer architecture, and/or other architectures. Users may access the system 400 hosting the shared artificial reality environment and/or communication environment via remote platform(s) 404. In this way, the remote platform(s) 404 can be configured to cause sending messages, facilitate having conversations, or making other communicative actions within the shared XR environment or general communication environment on client device(s) of the remote platform(s) 404, such as via the HMD 200, HMD system 250, and/or controllers 270a-270b of FIG. 2C. The remote platform(s) 404 can access artificial reality content and/or artificial reality applications for use in the shared artificial reality for the corresponding user(s) of the remote platform(s) 404, such as via the external resources 424. The computing platform(s) 402, external resources 424, and remote platform(s) 404 may be in communication and/or mutually accessible via the network 310.

The computing platform(s) 402 may be configured by machine-readable instructions 406. The machine-readable instructions 406 may be executed by the computing platform(s) to implement one or more instruction modules. The instruction modules may include computer program modules. The instruction modules being implemented may include one or more of key exchange module 408, encrypted content module 410, visibility module 412, key detection module 414, key rotation module 416, and/or other instruction modules.

As discussed herein, the key exchange module 408 can facilitate secure exchange of cryptographic keys between the remote platform(s) 404 and the computing platform(s). For example, the key exchange module 408 may enable client devices of the remote platform(s) 404 to share corresponding public keys paired to content encrypted by their private keys. As an example, the particular client device can share predetermined copies of public keys (e.g., of different types indicative of how much of the encrypted content can be decrypted) to designated other client devices or users of the remote platform(s) 404 via the key exchange module 408. The key exchange module 408 may track which users/client devices have provided copies of public or other cryptographic keys to other users/client devices via data stored in the electronic storage 426. The key exchange module 408 can implement a key transportation/transfer procedure where the sender (e.g., particular client device) distributes, to selected other parties, particular copies and/or types of public keys paired to the sender's private key. The selected other parties can be other users controlling devices (e.g., communication devices) of the remote platform(s) 404.

The key transportation may be based on selection of a value for secret keying material so that the key exchange module 408 of the computing platform(s) 402 can verify the accuracy and identity of the recipient. The security of the key transportation can be implemented based on wrapping keys and/or transport keys. Additionally or alternatively, the security of the key transfer can be based on application(s) uniquely controlled by the sending client device and/or receiving client device. For example, the key exchange module 408 can encrypt or wrap public keys being distributed to devices of the remote platform(s) 404. The function of the key exchange module 408 may be separated from private keys used to encrypt content being shared such that the private keys advantageously are never shared and held securely by their owner client devices. In this way, client devices of the remote platform(s) 404 can post or share encrypted content encrypted by their own private keys while securely transporting public keys to a subset of other client devices or users via the key exchange module 408 to control what portion or all of the encrypted content being shared is visible to which other client devices or users of the remote platform(s) 404.

The encrypted content module 410 may be used to generate the encrypted content being shared by client devices of the remote platform(s) 404. As an example, the client devices may use corresponding private keys stored by corresponding client devices to encrypt the content being shared, such as to encrypt content being posted on a computer network hosted location. In some embodiments, the remote platform(s) 404 may perform the content encryption and key generation for supporting the encryption while the encrypted content module 410 may merely receive the encrypted content and the key exchange module 408 of the computing platform(s) 402 may share the private key(s) used for partial or full decryption of the encrypted content. Encryption via the private key(s) can be based on a separate upstream application. This separation of functions advantageously may maintain the security of the private cryptographic information used to encrypt the content. Moreover, the users of the remote platform(s) 404 may decide what content should be encrypted or not encrypted, such as when posting content to a data group or social media feed.

The encrypted content module 410 can host/store all the received encrypted content and safeguard access by other non-creator users (i.e., users who are not the owner of the encrypted content), such as via a database or embedded data for determining whether the non-creator users are entitled to access part or all of the encrypted content. In some embodiments, upon determining that the particular client device of the remote platform(s) 404 has a valid public key counterpart for the encrypted content or has been designated by the content creator user for access (e.g., based on lookup of the database of the electronic storage 426), the computing platform(s) 402 may send some or all of the encrypted content to the particular client device (e.g., based on the commands or preferences of the content creator user). Subsequently, the particular client device may perform partial or full decryption of the encrypted content with the type of public key held by the particular client device. Because decryption occurs on the client side, the security of the decrypted content may be improved since the computing platform(s) 402 does not have access to the decrypted content.

The visibility module 412 may specify a visibility to the non-creator users of encrypted content being decrypted when shared by the content creator user or other users of the remote platform(s) 404. In some embodiments, the visibility can be based on a visibility parameter that specifies how much of a newsfeed, content post, and/or content item should be visible to a give non-creator user. For example, the content creator user or user that controls the encrypted content being shared can decide how much and/or which portions of the shared content should be visible. As an example, the controlling user may decide that certain violent content should not be visible to certain users due to age sensitivity. In such a scenario, the controlling user can provide user input indicating that a restricted public key (e.g., parental control type public key) is sent to the certain users for decryption of the encrypted content. As an example, the controlling user may use copies of various types of public keys corresponding to the private key used to encrypt the content in order to control which other users see personal and/or relevant portions of the encrypted content. In this way, for example, the controlling user beneficially can control which family members, friends, or other acquaintances are able to view which content shared to a social networking system or platform.

The key detection module 414 may detect whether a given device of the remote platform(s) 404 has a correct and valid cryptographic key to access encryption content managed by the encrypted content module 410 and/or stored in the electronic storage 426. The key detection module 414 can be in communicative operation with the electronic storage 426 and the key exchange module 408 to determine whether the key sent by the given device corresponds to the encrypted content that the given device is attempting to access. As an example, the electronic storage 426 may include a specific database with data records indicative of which other users/devices that the user of the given device has given partial or full permission to access encrypted content shared by the given device. That is, the electronic storage 426 can be used to track permissions to access encrypted content. For a particular content item, there may be a one to many or one to one encryption architecture. In particular, the electronic storage 426 may store multiple encrypted versions of the particular content item, such as managed by one application. Alternatively, the electronic storage 426 may store one encrypted version with separate applications for each permissioned other user to access the one encrypted version. As such, the key detection module 414 may be configured to detect a public key presented by the given device as corresponding to a user specific encrypted version or the one encrypted version via a user specific application. In either case, to be valid, the detected public key should be a counterpart paired key to the private key used to create the one encrypted version or multiple encrypted versions via one or more applications.

The key rotation module 416 may be used to rotate cryptographic keys if one or more copied/granted keys becomes compromised. If there is only one encrypted version of the particular content item, then the corresponding public key used to decrypt can be substituted. If there are multiple encrypted versions, then all copies of public keys used to access the content item may be deactivated and reissued. The key rotation module 416 can be informed of or inform the remote platform(s) 404 of a potential compromise or breach in the security of the existing active cryptographic keys. In either situation, the remote platform(s) 404 may be responsible for rotation or reissuing news keys to rotate the compromised keys. As an example, an application used to encrypt text for messaging or communication in an application or other environment can be in communication with the computing platform(s) 402 for secure key exchange to implement the key rotation. Such an application can have an open protocol for sending newly created/rotated public keys to the computing platform(s) 402 to deliver those public keys to designated other users of the remote platform (s) 404 for accessing encrypted content encrypted by the private key contained by the application. The application and/or the computing platform(s) 402 can include metadata so that the key rotation module 416 is aware of which other users to send/reissue rotated keys after the key rotation is performed. As discussed herein, the users that should hold valid public keys to access the encrypted content can be indicated by information stored in the electronic storage 426.

In addition, an XR module may be used to render the shared artificial reality environment for remote platform(s) 404 via the computing platform(s) 402, for example. The XR module may generate XR representations of navigation, communication, or scrolling actions, such as scrollbars, arrow keys, and/or the like. The XR module may also enable users to select communication options, such as messaging, communicating in virtual reality, verbal communication, or other communicative methods.

In some implementations, the computing platform(s) 402, the remote platform(s) 404, and/or the external resources 424 may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 402, the remote platform(s) 404, and/or the external resources 424 may be operatively linked via some other communication media.

A given remote platform 404 may include client computing devices, such as artificial reality device 302, mobile device 304, tablet 312, personal computer 314, laptop 316, and desktop 318, which may each include one or more processors configured to execute computer program modules. The computer program modules may be configured to enable an expert or user associated with the given remote platform 404 to interface with the system 400 and/or external resources 424, and/or provide other functionality attributed herein to remote platform(s) 404. By way of non-limiting example, a given remote platform 404 and/or a given computing platform 402 may include one or more of a server, a desktop computer, a laptop computer, a handheld computer, a tablet computing platform, a NetBook, a Smartphone, a gaming console, and/or other computing platforms. The external resources 424 may include sources of information outside of the system 400, external entities participating with the system 400, and/or other resources. For example, the external resources 424 may include externally designed XR elements and/or XR applications designed by third parties. In some implementations, some or all of the functionality attributed herein to the external resources 424 may be provided by resources included in system 400.

The computing platform(s) 402 may include the electronic storage 426, a processor such as the processors 110, and/or other components. The computing platform(s) 402 may include communication lines, or ports to enable the exchange of information with a network and/or other computing platforms. Illustration of the computing platform(s) 402 in FIG. 4 is not intended to be limiting. The computing platform(s) 402 may include a plurality of hardware, software, and/or firmware components operating together to provide the functionality attributed herein to the computing platform(s) 402. For example, the computing platform(s) 402 may be implemented by a cloud of computing platforms operating together as the computing platform(s) 402.

The electronic storage 426 may comprise non-transitory storage media that electronically stores information. The electronic storage media of the electronic storage 426 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). The electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 426 may include one or more virtual storage resources (e.g., cloud storage, a virtual private network, and/or other virtual storage resources). The electronic storage 426 may store software algorithms, information determined by the processor(s) 110, information received from computing platform(s) 402, information received from the remote platform(s) 404, and/or other information that enables the computing platform(s) 402 to function as described herein.

The processor(s) 110 may be configured to provide information processing capabilities in the computing platform(s) 402. As such, the processor(s) 110 may include one or more of a digital processor, an analog processor, a digital circuit designed to process information, an analog circuit designed to process information, a state machine, and/or other mechanisms for electronically processing information. Although the processor(s) 110 is shown in FIG. 1 as a single entity, this is for illustrative purposes only. In some implementations, the processor(s) 110 may include a plurality of processing units. These processing units may be physically located within the same device, or the processor(s) 110 may represent processing functionality of a plurality of devices operating in coordination. The processor(s) 110 may be configured to execute modules 408, 410, 412, 414, 416, and/or other modules. The processor(s) 110 may be configured to execute modules 408, 410, 412, 414, 416, and/or other modules by software; hardware; firmware; some combination of software, hardware, and/or firmware; and/or other mechanisms for configuring processing capabilities on the processor(s) 110. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the modules 408, 410, 412, 414, and/or 416 are illustrated in FIG. 4 as being implemented within a single processing unit, in implementations in which the processor(s) 110 includes multiple processing units, one or more of the modules 408, 410, 412, 414, and/or 416 may be implemented remotely from the other modules. The description of the functionality provided by the different modules 408, 410, 412, 414, and/or 416 described herein is for illustrative purposes, and is not intended to be limiting, as any of the modules 408, 410, 412, 414, and/or 416 may provide more or less functionality than is described. For example, one or more of the modules 408, 410, 412, 414, and/or 416 may be eliminated, and some or all of its functionality may be provided by other ones of the modules 408, 410, 412, 414, and/or 416. As another example, the processor(s) 110 may be configured to execute one or more additional modules that may perform some or all of the functionality attributed below to one of the modules 408, 410, 412, 414, and/or 416.

The techniques described herein may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

Figure 5:
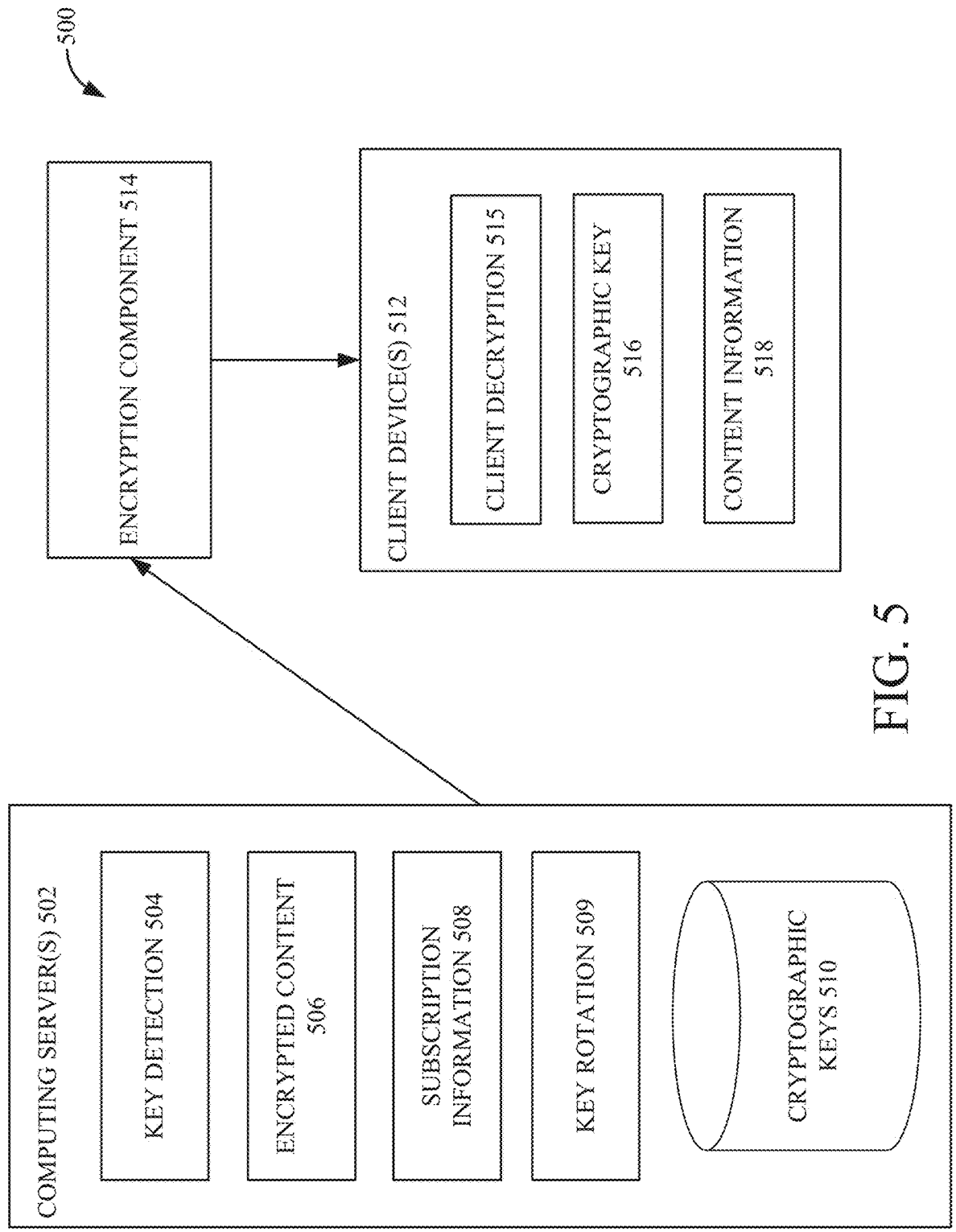
FIG. 5 is a block diagram illustrating an example computing cryptographic key exchange, according to certain aspects of the present disclosure.

FIG. 5 is a block diagram 500 illustrating an example computing cryptographic key exchange, according to certain aspects of the present disclosure. The example key exchange is based on a computer network architecture comprising computing server(s) 502, client device(s) 512, and an encryption component. The computing server(s) 502 may be configured to implement both a social network and a key exchange. In some embodiments, the computing server(s) 502 determine a visibility of shared content such as content posts based on a varying quantity of decryption, which can be represented by a type of cryptographic key held by a party seeking to decrypt the shared content. The computing server(s) 502 can facilitate a network-based form of communication, such as via the Internet. As an example, the computing server(s) 502 can be a component of a social media platform (e.g., a content platform) that enables conversations and information sharing such as content creation, content posting, content sharing, textual or verbal/audio messaging, mobile/computing device app based communication, and/or the like. For example, users of the social network implemented by the computing server(s) 502 may subscribe to a new feed comprising new and updated content items posted/shared by acquaintances (e.g., friends, family members, colleagues, user selected connection, etc.), content shared in a data/information group, and/or other shared content. User can use a user input mechanism (e.g., touchscreen, computer mouse, etc.) to select or configure settings for specifying a privacy setting, encryption setting, visibility setting, or other setting that indicates how shared content should be viewed by others. For example, the settings can indicate how much, when, and where content can be viewed, such as what subset of users can view what quantity of shared content.

The encryption component 514 can encrypt the shared content or any other content users desire to post to the social network. The encryption component 514 can comprise an app executed on a mobile device or other computing device of the client device(s) 512. Additionally or alternatively, the encryption component 514 can include functionality executed by the client device(s) 512 or remotely from the client device(s) 512. The app or the encryption component 514 can contain private key(s) possessed by users of the client device(s) 512, which can be used to encrypt text or other content. The encryption component 514 can include a key generation component or may be configured to receive private cryptographic keys from the client device(s) 512. Each client device 512 may possess one or more private keys used to encrypt corresponding personally owned content which can be shared as encrypted content via the social network and decrypted by client specified recipients of content and designated public keys via the secure key exchange functionality of the computing server(s) 502. The key generation can be performed by each client device 512 itself or by a computing component that is remote from each client device 512. For example, the cryptographic key logic 516 of the client device(s) 512 can include a cryptographic algorithm, random number generator, hashing component, or other cryptographic code operation for generating asymmetric or symmetric cryptographic keys.

The cryptographic key logic 516 or external cryptographic generation component may generate public-private key pairs for encryption and decryption data. In particular, copies of public keys of multiple types can be generated. In this way, when the sole private key of a key pair is used to encrypt a given content item, the various types of public keys can decrypt the given content item to varying extents, such that a varying portion or all of the given content item is visible to a given other user according to the desire of the private key possessor. Ciphertext that is part of each type of public key can distinguish the various public keys. The private key possessor (e.g., user of one of the client device(s) 512) can specify what portion(s) of text or other content of the given content item should be encrypted or not encrypted, for example. As discussed herein, the private key of the private key possessor used to encrypt content items being shared can be held by the possessor without being disclosed. Specifically, the private key possessor can use the private key to encrypt content items or other data shared onto the social media platform without disclosing the private key to the computing server(s) 502. The private key can be held securely in client device(s) by the cryptographic key logic 516. The content items or other data encrypted by the private key can be indicated and tracked by the content information logic 518. As an example, the content information logic 518 can be in communication with the computing server(s) 502 to select or determine what content should be uploaded to the social network, which could correspond to the subscription information logic 508 of the computing server(s) 502.

The content information logic 518 may define what portions of the content should be encrypted with which other users based on user input to the client device(s) 512 (e.g., which other users are permissioned and what portions of content they are allowed to decrypt). As an example, the client decryption logic 515 of a permissioned client device(s) 512 may execute the decryption using a public key corresponding to the private key used for the encryption. As described herein, the permissioned client device(s) 512 may receive the counterpart public key(s) via a secure key exchange implemented by the computing server(s) 502. For example, the public key(s) can be received based on code or logic executed to create a secure encrypted enclave in which the public key(s) corresponding to the private key are sent to the designated recipients specified by the holder of the private key. Upon performing the decryption by the client decryption logic 515, the permissioned client device(s) 512 may determine whether the decryption used valid language and/or is properly decrypted. For example, public keys held by the permissioned client device(s) can correspond to content streams or other subscribed content on the social media platform without disclosing the private encryption key to the computing server(s) 502. As such, the client decryption logic 515 should generate decrypted content according to content expected to be received by the permissioned client device(s) 512 from the content sharing private key holder.

The client decryption logic 515 may symmetrically receive a public key paired to a private key of a type corresponding to the content subscribed to by the permissioned client device(s) 512. For example, the private key holder may encrypt data of a certain content group and used copied public keys of varying types to enable other users to decrypt all of the content group or a subset of subgroups within the content group. The private key holder may also encrypt data such as conversation text uttered by the holder in an artificial reality environment with the holder's private key. Moreover, the private key can be used to encrypt the subscribed content with a varying quantity of session keys or other temporary keys so that the subscribed content can be encrypted with different visibility parameters. Different temporary keys used to encrypt the subscribed content can be matched to distributed public keys of different types so that various permissioned client device(s) 512 receive public keys of a type indicating what portion of the subscribed content (or other shared content item) that the corresponding permissioned client device(s) 512 is entitled to decrypt. Such information indicative of various content being shared and decryption permission grants may be stored in a cryptographic key information database 510 of the computing server(s) 502. In this way, upon presentation of public keys by various permissioned client device(s) 512, the computing server(s) 502 may identify what encrypted data or content of the social media platform should be sent to the permissioned client device(s) 512.

The computing server(s) 502 includes logic for facilitating cryptographic key exchange and sending encrypted content. The key detection logic 504 may detect whether a particular client device stores or sends a correct public key to decrypt encrypted content stored via the encrypted content logic 506. If the public key is not correct, then the computing server(s) 502 may cause the content to be not visible or limit the visibility of a portion of the encrypted content for the permissioned client device(s) 512. Additionally or alternatively, the key detection logic 504 may merely detect whether the permissioned client device(s) 512 possesses a public key of a valid type paired to the private key used to encrypt the encrypted content. If the presented public key is valid, the computing server(s) 502 could merely send the encrypted content to the permissioned client device(s) 512 via the encrypted content logic 506. In this case, the permissioned client device(s) 512 may use their public key to partially or fully decrypt the encrypted content so that that user of the permissioned client device(s) 512 may view the decrypted content according to the access granted by the private key holder. That is, the private key holder can grant public keys of types indicative of how much of the encrypted content (encrypted by the private key of the private key holder) that the private key holder wishes to make visible. The private key of the private key holder can be stored in a trusted execution environment such as an upstream app and can be secured against disclosure to the computing server(s) 502. Considering that decryption permissions are intentionally provided by the private key holder, the computing server(s) 502 may be informed in advance of whether certain users of certain client device(s) 512 have permissible public keys and/or permission to decrypt at least part of the encrypted content. The links between decryption permissions and users can be stored in the cryptographic key information database 510.

The subscription information logic 508 of the computing server(s) 502 may manage what subscription streams and/or subscribed content items that the permissioned client device(s) 512 have access to. As an example, the subscribed content information may include portions of a news feed managed by the social media platform. The key detection logic 504 and encrypted content logic 506 may detect that the permissioned client device(s) 512 is entitled to decrypt part of the news feed based on being a valid public key holder. The permissioned client device(s) 512 can use that public key to decrypt the encrypted news feed to view a subset or all news feed items according to a visibility parameter specified when the private key-public key pairing was made. Subscription information can be determined by the subscription information logic 508 based on the upstream app. In some embodiments, the computing server(s) may be unaware of the identities of users/devices holding valid public keys to access encrypted content or subscriptions.

The key rotation logic 509 can be used to rotate cryptographic keys if the private key holder gives away their key or their key becomes compromised or infiltrated in some way. The infiltrated key can be rotated and restored with another key once the infiltration has been identified and addressed. The computing server(s) 502 may facilitate such rotation, such as based on tracking who the private key holder previously granted access to the encrypted content or which cryptographic keys were previously copied. The key rotation logic 509 may be in communication with one or more apps for pushing encrypted content. If there are multiple encrypted versions of the same encrypted content under a particular encryption scenario that involves multiple permissioned users and apps, then the computing server(s) 502 may regenerate new encrypted versions upon determining that a security infiltration or compromise has occurred. If there is one encrypted version managed by one separate app, the key rotation logic 509 may perform key rotation and reissue new public and/or private keys according to the permission grants in existence prior to the security infiltration or compromise. The key rotation performed by the key rotation logic 509 may be facilitated based on key metadata stored by the computing server(s) such as type of key, key expiration temporal information, key owner client device, usage and/or purpose of key, etc.

Figure 6:
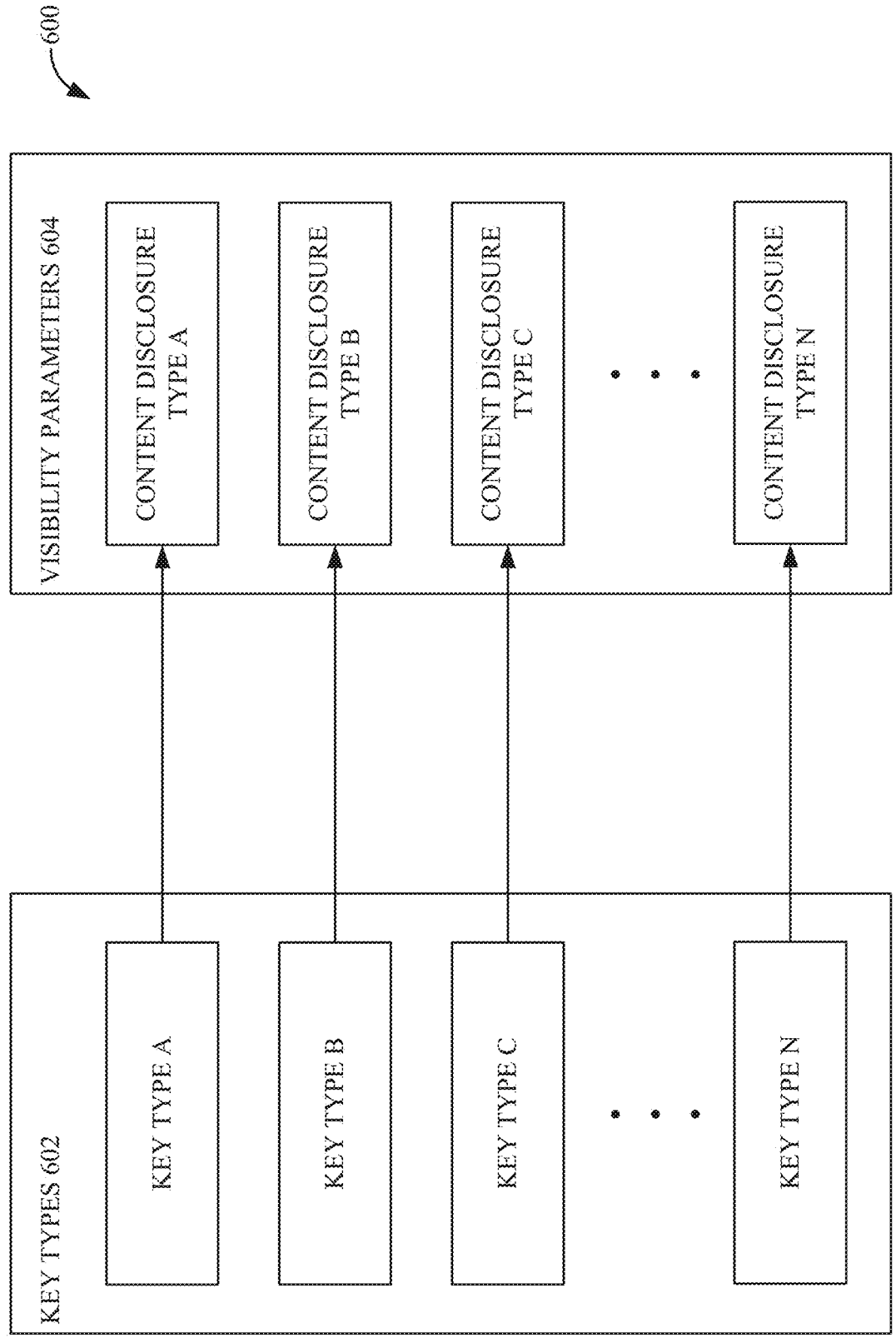
FIG. 6 is a block diagram illustrating an example of content visibility based on types of cryptographic keys, according to certain aspects of the present disclosure.

FIG. 6 is a block diagram 600 illustrating an example of content visibility based on types of cryptographic keys, according to certain aspects of the present disclosure. The block diagram 600 may include a key type block 602 and a visibility parameters block 604. The key type block 602 comprises multiple types of cryptographic keys which can correspond to multiple types of content visibility parameters. The relationship between key type and content visibility (e.g., content disclosure quantity) can be indicated by key metadata or content metadata stored or managed by a social/content platform server. In this way, the platform server may determine the visibility of encrypted content (e.g., platform content posts) based on what various users/devices are able to decrypt as well as perform secure cryptographic key exchange. The multiple types of cryptographic keys can include key type A, key type B, key type C . . . key type N, etc. The various types of cryptographic keys can be distinguished from each other based on metadata, ciphertext, hash codes, session key information, or other key parameter information. As an example, key type A can have properties including a different type, length, or parameter than the properties of key type B or some other key type.

In some embodiments, the multiple key types may be pre-generated and paired to a particular private key used to encrypt content hosted via the platform server. For example, the particular private key can encrypt a content post on a new feed managed by the platform server. The various instances of key types can be used to generate multiple copies of public keys used to decrypt the content post to varying degrees. In particular, the varying degrees of decryption correspond to varying content disclosure types. As an example, the key type A can correspond to content disclosure type A, the key type B can correspond to content disclosure type B, the key type C can correspond to content disclosure type C, the key type N can correspond to content disclosure type B, and/or the like. Varying content disclosure types may specify how many and which type of news stories on the new feed may be visible to a particular permissioned user/client device. For example, content disclosure types may specify visibility of only particular stories, posts, or content shared by a particular user. In general, content disclosure types may classify content visibility based on subject matter (e.g., genres, violence for parental control, region content restrictions, etc.), type of content, hardware specifications, software specifications, user preferences, location, and/or the like. Moreover, the varying content disclosure types may specify when a portion or all of the encrypted content may be available for decryption via a valid public key. In general, the key types of the key type block 602 can be mapped to the visibility parameters (content disclosure types) of the visibility parameter block 604 for instances of encrypted content, such as content items hosted via the platform server.

Figure 7:
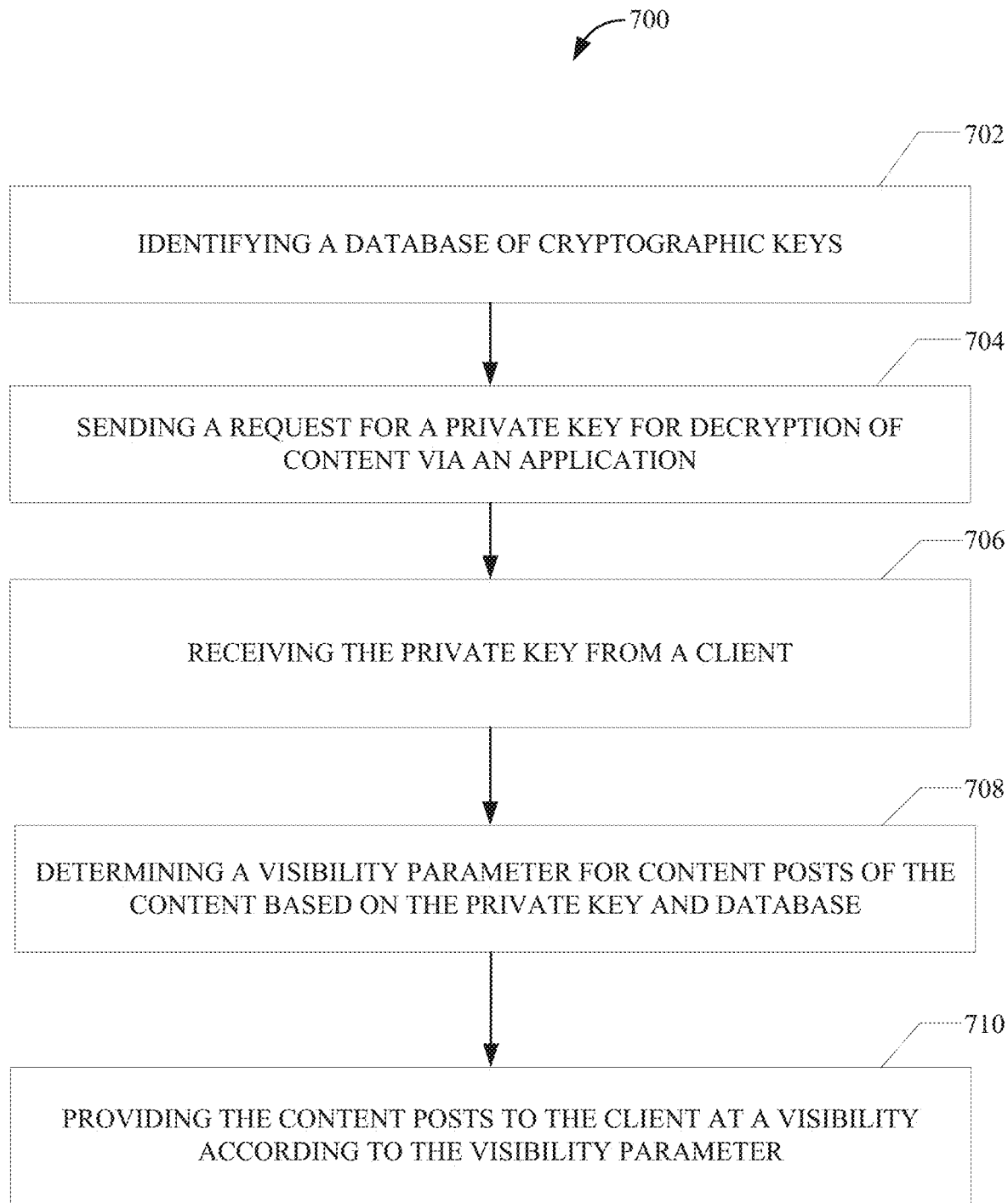
FIG. 7 is an example flow diagram for navigation through a shared artificial reality environment, according to certain aspects of the present disclosure.

FIG. 7 illustrates an example flow diagram (e.g., process 700) for providing an encryption key exchange in a computing network or shared artificial reality environment, according to certain aspects of the disclosure. For explanatory purposes, the example process 700 is described herein with reference to one or more of the figures above. Further for explanatory purposes, the steps of the example process 700 are described herein as occurring in serial, or linearly. However, multiple instances of the example process 700 may occur in parallel. For purposes of explanation of the subject technology, the process 700 will be discussed in reference to one or more of the figures above.

At step 702, a database of cryptographic keys configured for encryption may be identified. According to an aspect, identifying the database comprises providing, via the database and for the client, access to a content platform comprising the content. For example, the client may be configured to generate the private key and to encrypt the content. At step 704, a request for a private key for decryption of content may be sent. According to an aspect, sending the request comprises determining an attempt to access encrypted text of the content. According to an aspect, sending the request comprises decrypting the content by the client based on the private key. At step 706, the private key may be received from a client. According to an aspect, receiving the private key comprises receiving the private key via the application based on a prompt provided to the client upon the client accessing a content feed comprising the content posts.

At step 708, a visibility parameter for content posts of the content may be determined based on the private key and the database of cryptographic keys. According to an aspect, determining the visibility parameter for content posts of the content comprises determining a quantity of social network content posts that are visible according to an identity of the client. At step 710, the content posts may be provided at a visibility according to the visibility parameter. According to an aspect, providing the content posts at a visibility according to the visibility parameter comprises depicting a subset of the content posts as visible based on an extent of decryption corresponding to the private key.

According to an aspect, the process 700 may further include determining at least one user to be granted access to the content posts based on the database of cryptographic keys. According to an aspect, the process 700 may further include generating an encrypted version of the content posts for each holder of a cryptographic key of the cryptographic keys. According to an aspect, the process 700 may further include determining a breach in the encryption associated with the private key. According to an aspect, the process 700 may further include determining a quantity of other clients to receive new cryptographic keys to access the content posts according to the visibility parameter based on the breach and the client. According to an aspect, the process 700 may further include providing a new private key via the application and from the database and based on the breach and retirement of the private key.

Figure 8:
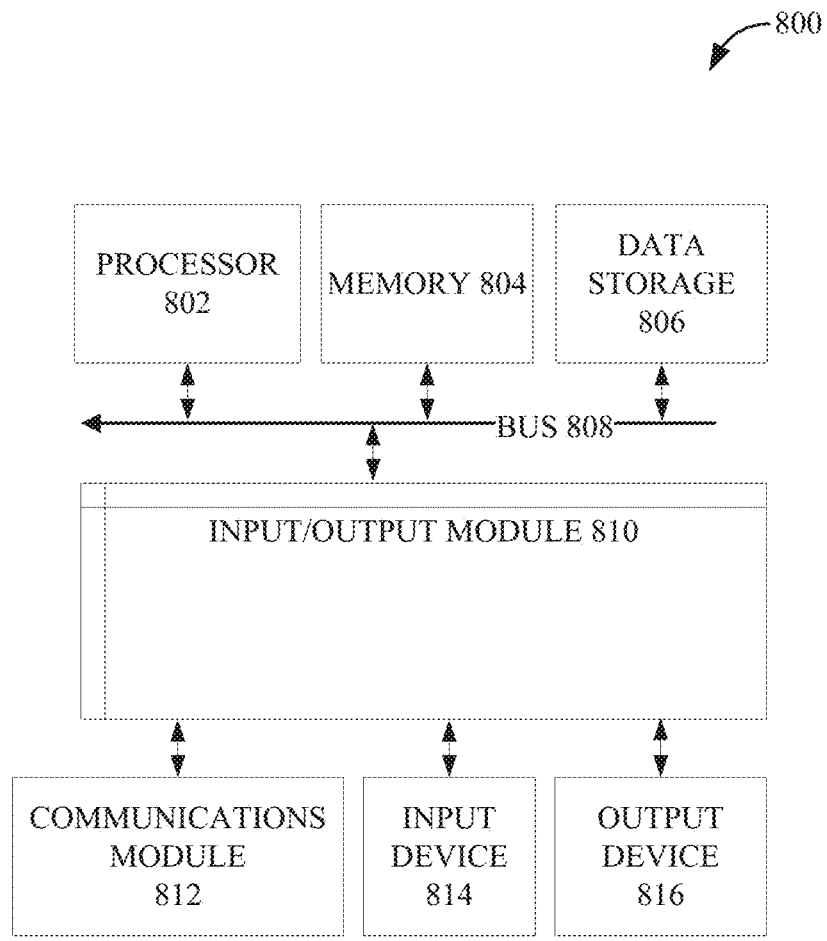
FIG. 8 is a block diagram illustrating an example computer system with which aspects of the subject technology can be implemented.

FIG. 8 is a block diagram illustrating an exemplary computer system 800 with which aspects of the subject technology can be implemented. In certain aspects, the computer system 800 may be implemented using hardware or a combination of software and hardware, either in a dedicated server, integrated into another entity, or distributed across multiple entities.

The computer system 800 (e.g., server and/or client) includes a bus 808 or other communication mechanism for communicating information, and a processor 802 coupled with the bus 808 for processing information. By way of example, the computer system 800 may be implemented with one or more processors 802. Each of the one or more processors 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 800 can include, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer-readable medium for execution by, or to control the operation of, the computer system 800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by the processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 800 further includes a data storage device 806 such as a magnetic disk or optical disk, coupled to bus 808 for storing information and instructions. The computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 include networking interface cards, such as Ethernet cards and modems. In certain aspects, the input/output module 810 is configured to connect to a plurality of devices, such as an input device 814 and/or an output device 816. Exemplary input devices 814 include a keyboard and a pointing device, e.g., a mouse or a trackball, by which a user can provide input to the computer system 800. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 816 include display devices such as an LCD (liquid crystal display) monitor, for displaying information to the user.

According to one aspect of the present disclosure, the above-described systems can be implemented using a computer system 800 in response to the processor 802 executing one or more sequences of one or more instructions contained in the memory 804. Such instructions may be read into memory 804 from another machine-readable medium, such as data storage device 806. Execution of the sequences of instructions contained in the main memory 804 causes the processor 802 to perform the process steps described herein. One or more processors in a multi-processing arrangement may also be employed to execute the sequences of instructions contained in the memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 800 can include clients and servers. A client and server are generally remote from each other and typically interact through a communication network. The relationship of client and server arises by virtue of computer programs running on the respective computers and having a client-server relationship to each other. The computer system 800 can be, for example, and without limitation, a desktop computer, laptop computer, or tablet computer. The computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 802 for execution. Such a medium may take many forms, including, but not limited to, non-volatile media, volatile media, and transmission media. Non-volatile media include, for example, optical or magnetic disks, such as the data storage device 806. Volatile media include dynamic memory, such as the memory 804. Transmission media include coaxial cables, copper wire, and fiber optics, including the wires that comprise the bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 800 reads XR data and provides an artificial reality, information may be read from the XR data and stored in a memory device, such as the memory 804. Additionally, data from the memory 804 servers accessed via a network, the bus 808, or the data storage 806 may be read and loaded into the memory 804. Although data is described as being found in the memory 804, it will be understood that data does not have to be stored in the memory 804 and may be stored in other memory accessible to the processor 802 or distributed among several media, such as the data storage 806.

The techniques described herein may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for providing an encryption key exchange, the method comprising:
    identifying a database of cryptographic keys configured for encryption;
    sending, via an application, a request for a private key for decryption of content;
    receiving, from a client, the private key;
    determining, based on data associated with the private key, a type of the private key;
    determining, based on the type of the private key and on the database of cryptographic keys, a visibility parameter for content posts of the content; and
    providing, to the client, the content posts at a visibility according to the visibility parameter.

2. The computer-implemented method of claim 1, wherein identifying the database comprises providing, via the database and for the client, access to a content platform comprising the content.

3. The computer-implemented method of claim 1, wherein sending the request comprises:
    determining an attempt to access encrypted text of the content; and
    decrypting, by the client, the content based on the private key.

4. The computer-implemented method of claim 1, wherein receiving the private key comprises receiving the private key via the application based on a prompt provided to the client upon the client accessing a content feed comprising the content posts.

5. The computer-implemented method of claim 1, wherein the data associated with the private key comprises at least one of metadata, ciphertext, and hash codes, and wherein determining the visibility parameter for the content posts of the content comprises determining a quantity of social network content posts that are visible according to an identity of the client.

6. The computer-implemented method of claim 1, wherein providing the content posts at a visibility according to the visibility parameter comprises depicting a subset of the content posts as visible based on an extent of decryption corresponding to the private key.

7. The computer-implemented method of claim 1, wherein the client is configured to generate the private key and to encrypt the content.

8. The computer-implemented method of claim 1, further comprising determining at least one user to be granted access to the content posts based on the database of cryptographic keys.

9. The computer-implemented method of claim 1, further comprising generating an encrypted version of the content posts for each holder of a cryptographic key of the cryptographic keys.

10. The computer-implemented method of claim 1, further comprising:
    determining a breach in an encryption associated with the private key;
    determining, based on the breach and the client, a quantity of other clients to receive new cryptographic keys to access the content posts according to the visibility parameter; and
    providing, via the application and from the database, a new private key based on the breach and retirement of the private key.

11. A system for providing an encryption key exchange, comprising:
    one or more processors; and
    a memory comprising instructions stored thereon, which when executed by the one or more processors, causes the one or more processors to perform:
        identifying a database of cryptographic keys configured for encryption;
        sending, via an application, a request for a private key for decryption of content;

receiving, from a client, the private key;

determining, based on data associated with the private key, a type of the private key;

determining, based on the type of the private key and on the database of cryptographic keys, a visibility parameter for content posts of the content;

providing, to the client, the content posts at a visibility according to the visibility parameter;

determining a breach in an encryption associated with the private key; and providing, via the application and from the database, a new private key based on the breach and retirement of the private key.

12. The system of claim 11, wherein the instructions that cause the one or more processors to perform identifying the database cause the one or more processors to perform providing, via the database and for the client, access to a content platform comprising the content.

13. The system of claim 11, wherein the instructions that cause the one or more processors to perform sending the request cause the one or more processors to perform:
   determining an attempt to access encrypted text of the content; and
   decrypting, by the client, the content based on the private key.

14. The system of claim 11, wherein the instructions that cause the one or more processors to perform receiving the private key cause the one or more processors to perform receiving the private key via the application based on a prompt provided to the client upon the client accessing a content feed comprising the content posts.

15. The system of claim 11, wherein the data associated with the private key comprises at least one of metadata, ciphertext, and hash codes, and wherein the instructions that cause the one or more processors to perform determining the visibility parameter for the content posts of the content cause the one or more processors to perform determining a quantity of social network content posts that are visible according to an identity of the client.

16. The system of claim 11, wherein the instructions that cause the one or more processors to perform providing the content posts at a visibility according to the visibility parameter cause the one or more processors to perform depicting a subset of the content posts as visible based on an extent of decryption corresponding to the private key.

17. The system of claim 11, further comprising stored sequences of instructions, which when executed by the one or more processors, cause the one or more processors to perform determining at least one user to be granted access to the content posts based on the database of cryptographic keys.

18. The system of claim 11, further comprising stored sequences of instructions, which when executed by the one or more processors, cause the one or more processors to perform generating an encrypted version of the content posts for each holder of a cryptographic key of the cryptographic keys.

19. The system of claim 11, further comprising stored sequences of instructions, which when executed by the one or more processors, cause the one or more processors to perform determining, based on the breach and the client, a quantity of other clients to receive new cryptographic keys to access the content posts according to the visibility parameter.

20. A non-transitory computer-readable storage medium comprising instructions stored thereon, which when executed by one or more processors, cause the one or more processors to perform operations for providing an encryption key exchange, comprising:
   identifying a database of cryptographic keys configured for encryption;
   sending, via an application, a request for a private key for decryption of content;
   receiving, from a client, the private key;
   determining, based on data associated with the private key, a type of the private key;
   determining, based on the type of the private key and on the database of cryptographic keys, a visibility parameter for content posts of the content;
   providing, to the client, the content posts at a visibility according to the visibility parameter;
   determining a breach in an encryption associated with the private key;
   determining, based on the breach and the client, a quantity of other clients to receive new cryptographic keys to access the content posts according to the visibility parameter; and
   providing, via the application and from the database, a new private key based on the breach and retirement of the private key.

* * * * *